United States Patent
Lin et al.

(10) Patent No.: US 9,985,548 B2
(45) Date of Patent: May 29, 2018

(54) COMMUNICATION CIRCUIT FOR FLYBACK POWER CONVERTER WITH SYNCHRONOUS RECTIFIER

(71) Applicant: SEMICONDUCTOR COMPONENTS INDUSTRIES, LLC, Phoenix, AZ (US)

(72) Inventors: Li Lin, Zubei (TW); Zhibo Tao, Palo Alto, CA (US); Chih Hsien Hsieh, Changhua County (TW); Yue-Hong Tang, Nantou County (TW); Ching Wen Fu, Taipei (TW); Ju-Hyun Kim, Kyounggi-Do (KR)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 0 days. days.

(21) Appl. No.: 15/626,347

(22) Filed: Jun. 19, 2017

(65) Prior Publication Data
US 2017/0373606 A1 Dec. 28, 2017

Related U.S. Application Data

(60) Provisional application No. 62/354,257, filed on Jun. 24, 2016.

(51) Int. Cl.
H02M 3/335 (2006.01)
H02M 1/00 (2006.01)
H02M 3/28 (2006.01)
H02M 3/24 (2006.01)

(52) U.S. Cl.
CPC ......... *H02M 3/33592* (2013.01); *H02M 3/24* (2013.01); *H02M 3/28* (2013.01); *H02M 3/285* (2013.01); *H02M 3/335* (2013.01); *H02M 3/33515* (2013.01); *H02M 2001/0012* (2013.01)

(58) Field of Classification Search
CPC ......... H02M 3/33515; H02M 3/33523; H02M 3/33576; H02M 3/33592
USPC ............... 363/21.13, 21.14, 21.16, 21.18, 78
See application file for complete search history.

(56) References Cited

U.S. PATENT DOCUMENTS

| 8,634,216 B2 * | 1/2014 | Chapman | H02M 3/33523 363/17 |
|---|---|---|---|
| 2014/0098578 A1 * | 4/2014 | Halberstadt | H02M 3/33515 363/21.15 |
| 2014/0268919 A1 * | 9/2014 | Yao | H02M 3/33523 363/21.15 |

* cited by examiner

*Primary Examiner* — Gary Nash
(74) *Attorney, Agent, or Firm* — Atesa Legal PLLC

(57) ABSTRACT

A method for communicating with a power converter comprises initiating a communication sequence by sensing a first distortion of a sensed waveform during a discharge period of a first power transfer cycle of the power converter. The sensed waveform is proportional to a secondary current of the power converter. At a primary side of the power converter, a data bit is received from a secondary side of the power converter, by sensing a second distortion to represent one state of the data bit and sending an absence of the second distortion to represent another state of the data bit. The secondary distortion is applied to the secondary current during the discharge period of a subsequent power transfer cycle.

18 Claims, 10 Drawing Sheets

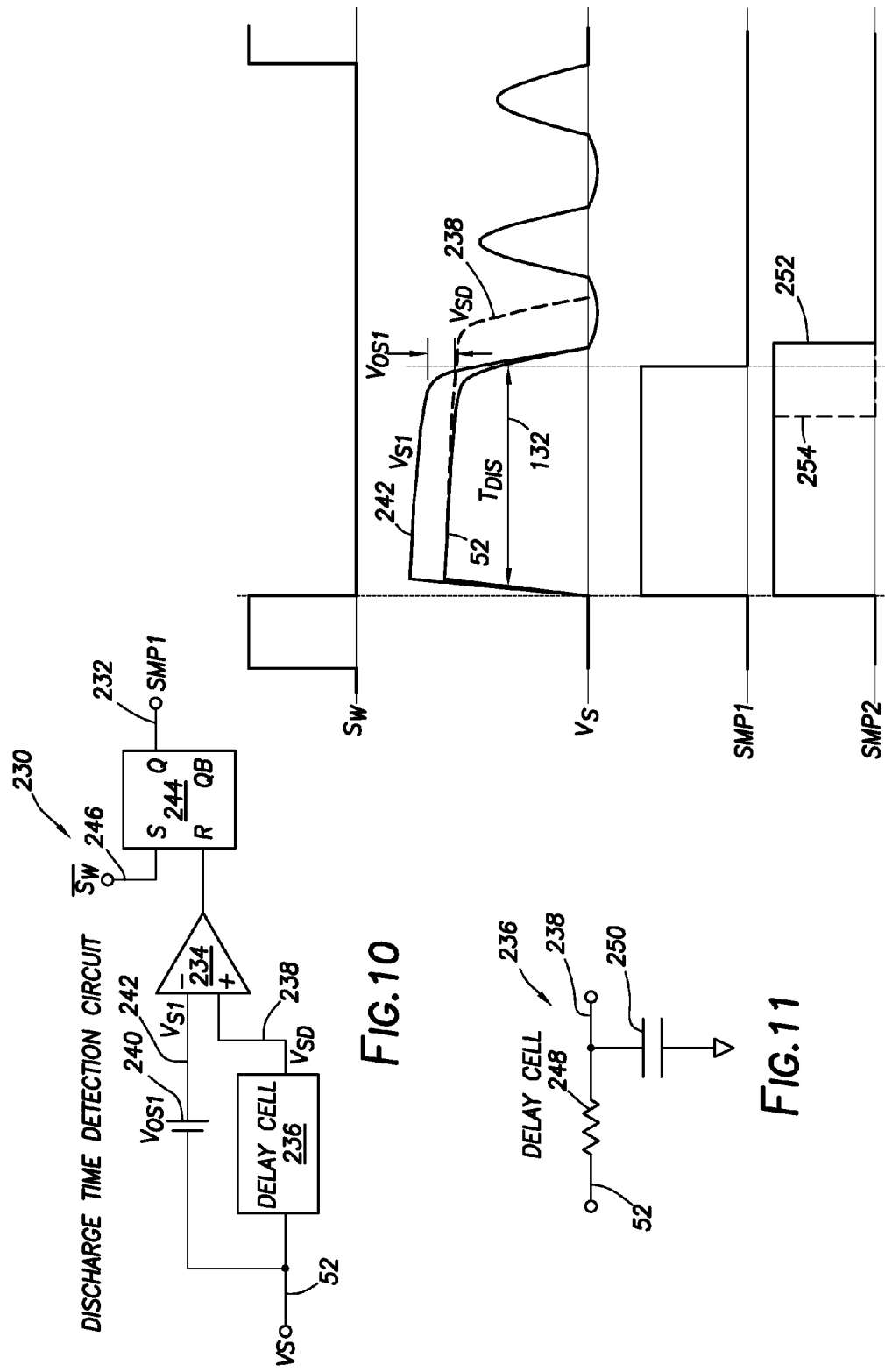

COMMUNICATION CIRCUIT FOR FLYBACK POWER CONVERTER WITH SYNCHRONOUS RECTIFIER

CROSS-REFERENCE TO RELATED APPLICATIONS

This application is a utility application claiming priority to U.S. Provisional Application Ser. No. 62/354,257 filed on Jun. 24, 2016 entitled "COMMUNICATION CIRCUIT FOR FLYBACK POWER CONVERTER WITH SYNCHRONOUS RECTIFIER," the entirety of which is incorporated by reference herein.

FIELD

The disclosure relates generally to an adaptive power converter, and more specifically to a communication circuit for transferring messages from the secondary side to the primary side of the adaptive power converter.

BACKGROUND

The prevalence of adaptive travel adaptors (TA) and fast chargers is increasing due to the popularity of mobile electronic systems. In an adaptive TA system, a traditional flyback power converter operates as a power stage with a protocol Integrated Circuit (IC) providing an interface between the TA and a sink device (e.g., a mobile phone, or device that "sinks" current supplied by the power converter). Typically, the protocol IC receives and decodes a command sent from the sink device, and in response, the adaptive TA system changes an operating characteristic of the power converter.

The changes to the operating characteristic can be implemented at the secondary side of the adaptive TA system, however from a power stage optimization perspective it is preferred to be implemented at a primary side, to realize a truly adaptive power delivery based on a power request from the sink device.

Conventional adaptive TA systems use an optical isolator (e.g. optocoupler) for transferring a protocol message from the secondary side to the primary side, thus increasing cost and reducing system reliability. The secondary side protocol IC receives the protocol message from the sink device, encodes and sends the protocol message to the primary side through the optical isolator. The primary side control IC receives the encoded protocol message from the optical isolator, further decodes the message and responds by changing an operating characteristic of the TA system from the primary side. Because the protocol IC is located at the secondary side, a reliable and cost effective circuit and method are needed to realize effective communication between the secondary side and primary side in the adaptive power system.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

FIG. 10 is a schematic view of the discharge time detection circuit shown in FIG. 9 according to an embodiment of the present disclosure.

FIG. 11 is a schematic view of the delay cell shown in FIG. 10 according to an embodiment of the present disclosure.

FIG. 12 is a graphical view of the switching signal $S_W$, the sensing signal $V_S$, signals SMP1 and SMP2 according to an embodiment of the present disclosure.

DETAILED DESCRIPTION

Embodiments of systems and methods described herein provide for a reliable and cost effective communication circuit and method for transferring messages between the secondary side and the primary side of an adaptive power converter without requiring optical isolation (e.g., with an optocoupler). The primary and secondary side of the power converter refers to the two sides of the converter that are galvanically decoupled by a transformer.

A new Pre-defined Synchronous Rectifier (SR) switch encoding method can remove the requirement for an optocoupler for message communication from the secondary side to the primary side in an adaptive flyback power converter. The proposed circuit and method will make use of adaptive flyback power converter without adding any extra components to realize a cost effective and more reliable secondary side to primary side communication. Example embodiments are shown throughout this disclosure for a flyback Pulse Width Modulated (PWM) power converter, however the teachings of this disclosure are also applicable to a forward PWM converter.

Figure 1:
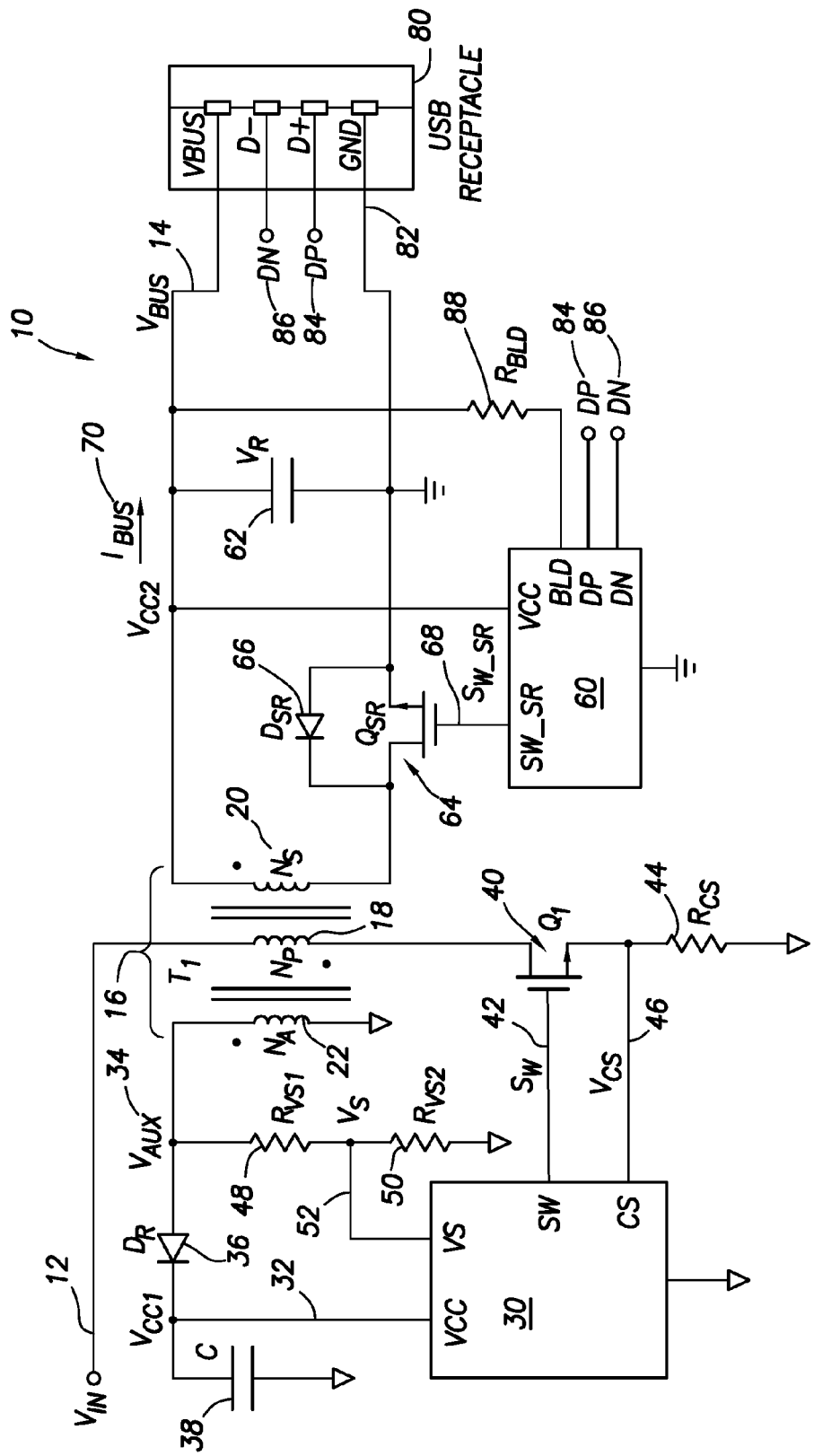
FIG. 1 is a schematic view of an adaptive flyback power system with a synchronous rectifier according to an embodiment of the present disclosure.

FIG. 1 shows an embodiment of an adaptive flyback power system 10 configured to convert an input voltage ($V_{IN}$) 12 to an output bus voltage ($V_{BUS}$) 14 with synchronous rectification. The embodiment 10 of the flyback power converter has a transformer ($T_1$) 16 including a primary winding ($N_P$) 18, a secondary winding ($N_S$) 20 and an auxiliary winding ($N_A$) 22. The transformer 16 separates a primary side, including the components connected to the primary winding 18, from a secondary side, including the components connected to the secondary winding 20.

The power system 10 includes a primary side controller 30 powered by a supply voltage ($V_{CC1}$) 32. The supply voltage 32 is derived from an auxiliary voltage ($V_{AUX}$) 34, which correlates to the bus voltage 14. The auxiliary voltage 34 is rectified by a diode 36 and stored on a filtering capacitor 38. The primary side controller 30 is coupled to the transformer 16 via a power transistor ($Q_1$) 40, and is configured to switch the transformer 16 with a switching signal (Sw) 42 to transfer energy from the primary winding 18 to the secondary winding 20 and auxiliary winding 22. When the power transistor 40 is activated, a primary current flows through a current sense resistor ($R_{CS}$) 44 to develop a voltage ($V_{CS}$) 46, which is monitored by the primary side controller 30. The voltage ($V_S$) 52 on a voltage-sensing terminal of the primary side controller 30 is coupled to the auxiliary winding 22 through a voltage divider including resistors ($R_{VS1}$) 48 and ($R_{VS2}$) 50 for detecting a percentage of the auxiliary voltage 34, and generating the sensing signal 52.

The secondary side of the power system 10 includes a synchronous rectifier controller 60 powered by a supply voltage ($V_{CC2}$) developed across a filtering capacitor (Co) 62. The supply voltage is equivalent to the bus voltage 14. The secondary winding 20 is coupled to the bus voltage 14 terminal of a receptacle (connector) 80, such as a USB receptacle, for providing the bus voltage 14 to a sink device (e.g., mobile phone) via a cable, such as a USB cable. The second terminal of the secondary winding 20 is also coupled to an SR switch or transistor ($Q_{SR}$) 64 and a body diode ($D_{SR}$) 66, the transistor 64 being controlled by the synchronous rectifier controller 60 with the switching signal ($S_{W\_SR}$) 68, thereby gating the bus current ($I_{BUS}$) 70 flowing between the bus voltage 14 and a ground 82. In various embodiments, the ground 82 is a same ground reference as used by the synchronous rectifier controller 60 and the primary side controller 30. In other embodiments, the primary side controller 30 has a different ground reference than that used by the synchronous rectifier controller 60.

The positive data terminal DP 84 and negative data terminal DN 86 of the secondary side control circuit are coupled to the data terminals DP 84 and DN 86 of the receptacle 80 to receive and decode the message (command) sent from the sink device. In some embodiments, the synchronous rectifier controller 60 also includes a bleeder circuit (e.g., a resistor $R_{BLD}$), 88 to increase a current demand on the power system 10 when a deep DCM operation is detected. Specifically, current is sunk through the bleeder circuit 88 in parallel with the current sunk by the sink device (not shown) connected to the receptacle 80.

Figure 2:
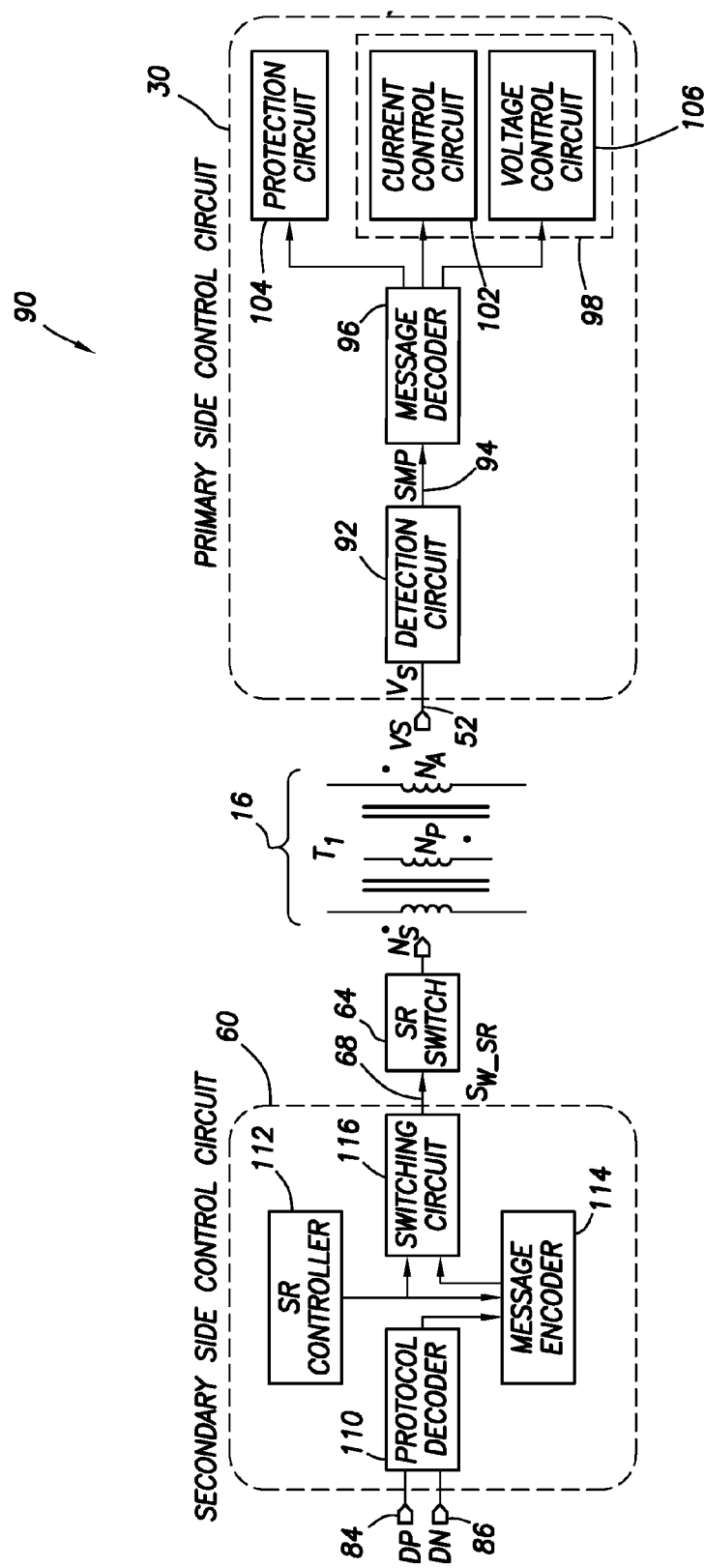
FIG. 2 is a functional block diagram of a communication circuit according to an embodiment of the present disclosure.

FIG. 2 shows a functional block diagram of a communication circuit 90 according to an embodiment of the present invention. The embodiment of the communication circuit 90 transfers a message from the synchronous rectifier 60, on the secondary side, to the primary side controller 30, on the primary side, without requiring an optocoupler. The communication circuit 90 comprises a protocol decoder 110, a message encoder 114, a switching circuit 116, a detection circuit 92, and a message decoder 96. The synchronous rectifier controller 60 comprises the protocol decoder 110, the message encoder 114, the switching circuit 116, and a synchronous rectifier-controller (SR controller) 112. The primary side controller comprises the detection circuit 92 providing a Switch Mode Power (SMP) signal 94 to the message decoder 96. The message decoder 96 is connected to a regulation circuit 98 and a protection circuit 104. In an example embodiment, the regulation circuit 98 includes a Voltage Control (VC) circuit 100 and a Current Control (CC) circuit 102.

The protocol decoder 110 is coupled to the data terminals DP 84 and DN 86 to receive and decode the protocol message (command) sent from the sink device as a differential signal. In some embodiment, the message encoder 114 is implemented in the synchronous rectifier controller 60 that receives the decoded protocol message (command) from the protocol decoder 110 and encodes the decoded message (command) by a pre-defined switching sequence of the SR switch 64. The pre-defined switching sequence of the SR switch 64 transfers the encoded message to the primary side in a form of analog signal via the transformer 16. The SR controller 112 generates a switching signal 68 for the SR switch 64.

The switching circuit 116 is coupled to the SR controller 112 and the message encoder 114 to receive the control signal and the encoded message. The switching circuit 116 generates the switching signal 68 in response to the control signal and the encoded message to switch the SR switch 64. The switching circuit 116 is a logic circuit according to an embodiment of the present invention.

The detection circuit 92 detects the encoded message through the voltage 52 on the voltage-sensing terminal to provide the SMP signal 94. The message decoder 96 decodes the signal SMP 94 to retrieve the protocol message sent from the secondary side. The primary side control circuit then responds to the retrieved protocol message to regulate the bus voltage 14 with the CV circuit 100, to regulate the bus current 70 with the CC circuit 102 or to change a protection mode with the protection circuit 104. Non-limiting examples of protection modes include over-voltage protection of the bus voltage 14, under-voltage protection of the bus voltage 14 and over-current protection of the bus current 70.

Figure 3:
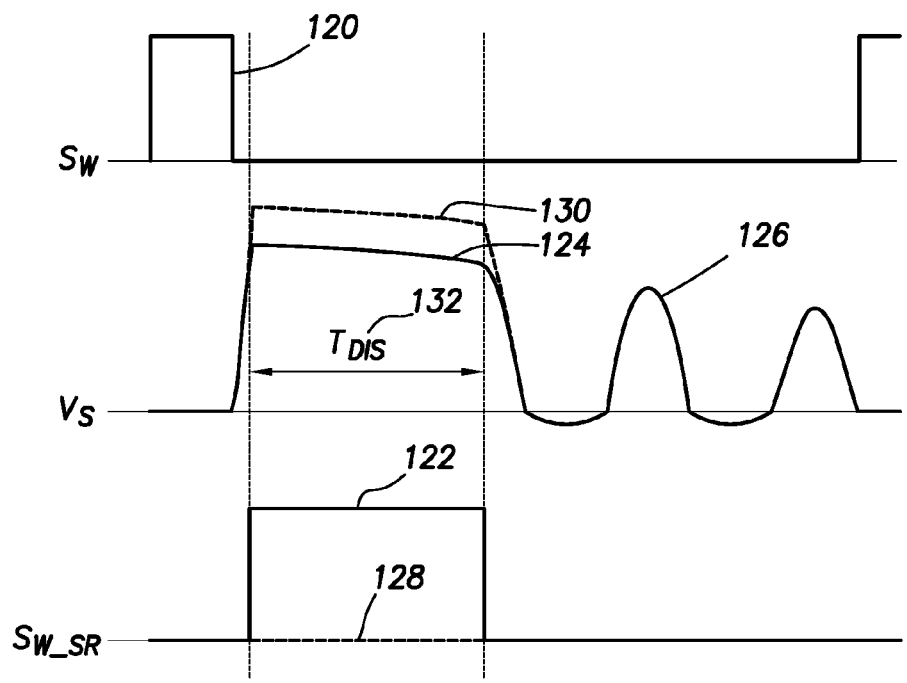
FIG. 3 is a graphical view of the switching signals $S_W$, $S_{W\_SR}$, and the sensing signal $V_S$ without distortion during the discharge time $T_{DIS}$ according to an embodiment of the present disclosure.
Figure 4:
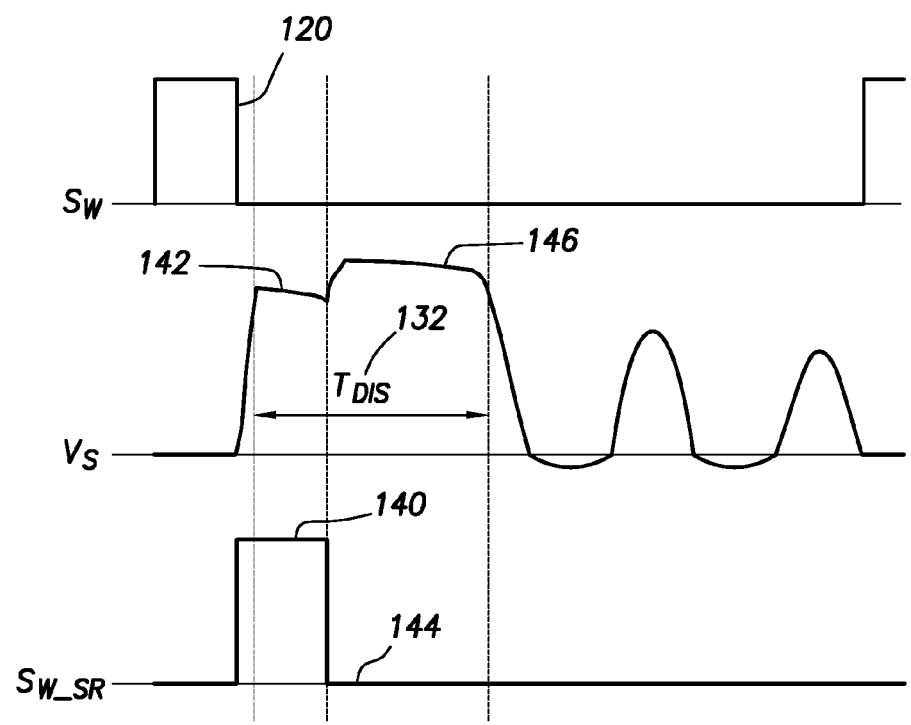
FIG. 4 is a graphical view of the switching signals $S_W$, $S_{W\_SR}$, and the sensing signal $V_S$ distorted during the discharge time $T_{DIS}$ according to an embodiment of the present disclosure.

FIG. 3 and FIG. 4 are graphical views comparing the voltage ($V_S$) 52 on the voltage sensing terminal, the switching signal ($S_W$) 42 from the primary side controller 30 and the switching signal ($S_{W\_SR}$) 68 from the synchronous rectifier controller 60 for an embodiment having no distortion during a discharge period (see FIG. 3) compared with an embodiment having distortion during the discharge period (see FIG. 4).

Referring to FIG. 1 and FIG. 3, the SR switch 64 is controlled to prevent distortion on the waveform of the voltage 52 on the voltage-sensing terminal during the discharge time ($T_{DIS}$) 132. The trailing edge 120 of the switching signal 42 stops the current flowing through the primary winding 18 and starts the current discharge through the secondary winding 20, (from the decay of the magnetic flux in the transformer 16 formed during from the primary current). When the SR switch 64 is activated as shown by 122, the sensing signal is as shown by the waveform 124. Following the discharge period 132, (after the magnetic flux has been depleted from the core of the transformer 16), the secondary current continues to resonate as shown at 126.

When the SR switch 64 is deactivated as shown by 128, the sensing signal waveform increases as shown by 130 due to the current 70 flowing through the diode ($D_{SR}$) 66. In various embodiments, the SR switch 64 is deactivated at a zero crossing point where the sensing signal is minimal. In contrast to the waveforms shown in FIG. 3, FIG. 4 shows a discontinuity during the discharge period 132 caused by the SR switch transitioning between being active at 140 and inactive at 144, resulting in the waveform at 142 making a step transition to 146. Detection of the step between 142 and 146 or the absence thereof, is used to encode either a logic "1" or logic "0" respectively, or conversely a logic "0" or logic "1" respectively. In some embodiments, a pulse is encoded by transitioning the switching signal from the active state 140 to an inactive state 144 and back to the active state 140. Either the leading edge or falling edge of the pulse is detected to determine the presence of an alternate state on the waveform of the sensing signal.

Figure 5:
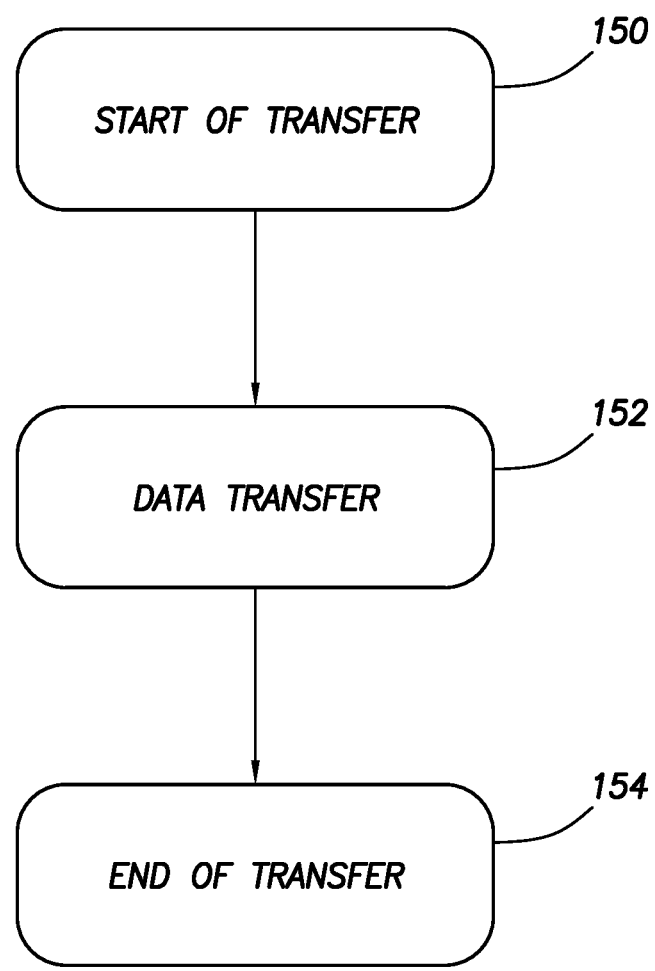
FIG. 5 is a flowchart representation of a method for communication between the secondary side and the primary side of a flyback power converter, in accordance with an embodiment of the present disclosure.

FIG. 5 shows a flowchart representation of a method for communication between the secondary side and primary side of a power converter. At step 150, the transfer is started by detecting a first distortion of the waveform of the sensing signal 52. In one example embodiment, the first distortion includes a step function on the waveform, formed by activating the switching signal 68. In another embodiment, the first distortion includes one or more pulses on the waveform, formed by pulsing the switching signal 68 one or more times accordingly. At step 152, the data are transferred between the secondary side and the primary side by receiving a protocol message from the sink device attached to the receptacle 80, decoding the message, encoding the message as one or more data bits and conditionally distorting the waveform at the voltage sensing terminal 52. In one embodiment, waveform is distorted once per discharge cycle for a plurality of discharge cycles, until the message has been passed to the primary side controller 30. In one example, passing a message encoded as "1101" results in distorting the waveform for the first, second and fourth sequential discharge cycle, (similar to FIG. 4, and not distorting the waveform for the third discharge cycle, (similar to FIG. 3). In another embodiment, the message "1101" results in distorting only the third discharge cycle, wherein a distortion represents a logical "0". At step 154, the transfer is ended by distorting the waveform of the voltage-sensing terminal 52 one or more times during a discharge cycle.

In various embodiments, the end of transfer 154 step is omitted and the number of discharge cycles required to complete the data transfer 152 is programmed or defined by the power system before the start of transfer 150. In other embodiments, the end of transfer 154 step is retained as an acknowledgment from the secondary side to the primary side that the data transfer 152 has completed, in addition to defining in the primary-side controller, the number of discharge cycles required to complete the data transfer 152. In one example, the primary-side controller 30 has a register programmed during manufacture of the controller to define the number of discharge cycles required for data transfer 152. In another embodiment, the primary-side controller 30 is programmed by the user to determine the required number of discharge cycles.

Figure 6:
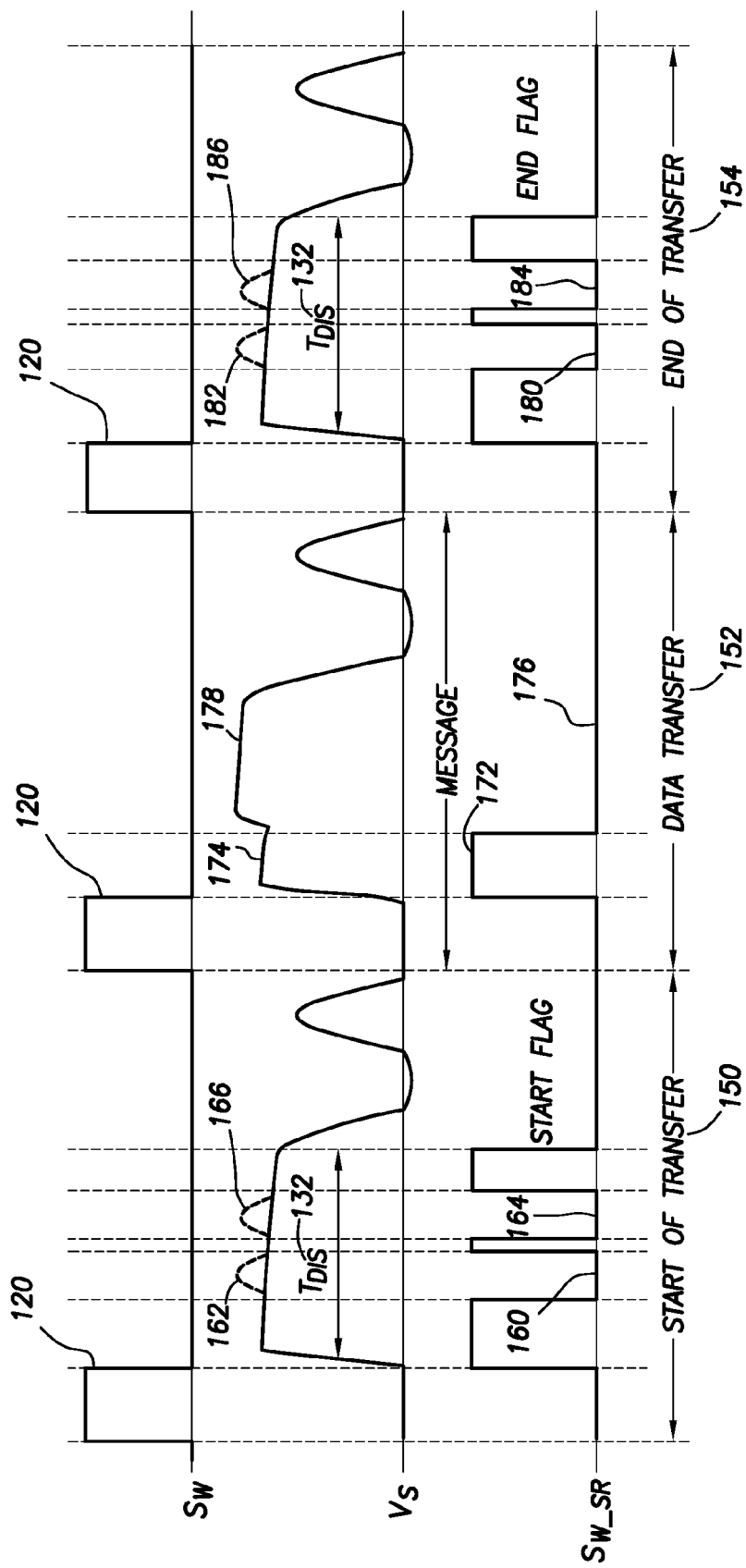
FIG. 6 is a graphical view of the switching signals $S_W$, $S_{W\_SR}$, and the sensing signal $V_S$ of a communication sequence during a Discontinuous Conduction Mode (DCM) condition in accordance with an embodiment of the present disclosure.

FIG. 6 shows the three steps of FIG. 5 for a communication sequence of a flyback power converter operating in a DCM condition, including the voltage ($V_S$) 52 on the voltage sensing terminal, the switching signal ($S_W$) 42 from the primary side controller 30 and the switching signal ($S_{W\_SR}$) 68 from the synchronous rectifier 60. Referring to FIG. 1 and FIG. 6, the communication sequence begins with the "Start of Transfer" step 150 initiated by the synchronous rectifier controller 60 pulsing the SR switch at 160 to create a waveform distortion 162, and at 164 to create a waveform distortion 166. In this example embodiment, the two distortions 162 and 166, detected during the single discharge period 132, serve as a start flag to configure the primary side controller 30 to advance to the "Data Transfer" step 152 to receive a message. In another embodiment, only one distortion is applied and detected during the start of transfer 150.

The synchronous rectifier controller 60 on the secondary side will encode the protocol command as series of 1s and 0s following a pre-defined encoding method to control the SR switch 64. The primary side controller 30 will detect the encoded message through the waveform of the sensing signal ($V_S$) 52 using the detection circuit 92, and further decode with the message decoder 96 to retrieve the protocol message. In one embodiment, one bit is transferred in one switching cycle of the switching signal $S_W$ 42 by activating the SR switch 64 at 172 corresponding to the waveform at 174, then deactivate the SR switch 64 at 176 to cause the waveform distortion 178. In another embodiment, where the protocol message requires 8 bits for encoding, 8 sequential switching cycles of the switching signal $S_W$ are used to transfer the encoded data to the primary side controller.

In another embodiment, the SR switch 64 is capable of being pulsed multiple times during the discharge time $T_{DIS}$ of one switching cycle of the switching signal $S_W$, and therefore multiple bits are transferred in one switching cycle of the switching signal $S_W$. In one example, four bits are transferred in a single discharge cycle, where the SR switch 64 is pulsed for a logic "1" and not pulsed for a logic "0." The primary-side controller receives four bits in one discharge cycle by timing the arrival of each of the four bits with respect to the start of the discharge cycle and thereby extracting four bits. When the synchronous rectifier controller needs 8-bits to encode the protocol message, then only 2 switching cycles of the switching signal $S_W$ (e.g., two discharge cycles) are required to transfer the encoded data to the primary side controller.

In one embodiment, after the secondary side transfers the encoded protocol messages, the communication procedure enters the "End of Transfer" 154 step by the synchronous rectifier controller 60 toggling the SR switch twice at 180 and 184 to cause waveform distortions 182 and 186 respectively in the same discharge period 132. The two distortions are detected as an end flag to exit the communication sequence. In another embodiment, only one distortion is used in the discharge cycle to signal the "End of Transfer" 154.

Figure 7:
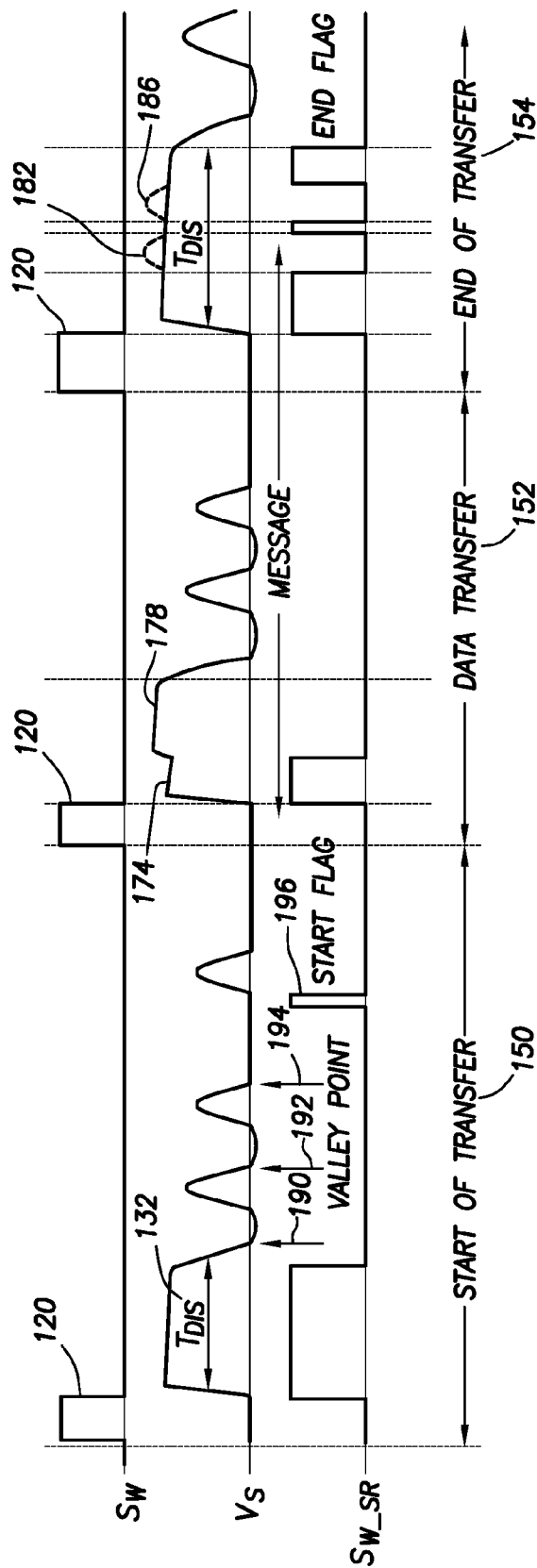
FIG. 7 is a graphical view of the switching signals $S_W$, $S_{W\_SR}$, and the sensing signal $V_S$ of a communication sequence during a deep DCM condition in accordance with an embodiment of the present disclosure.

Turning now to FIG. 7 with continued reference to FIG. 1 and FIG. 6, a communication sequence is described for a power system operating in a deep DCM condition. During the start of transfer step 150, a deep DCM condition is detected at a very light load, (or no load), condition by comparing the switching frequency of the primary side controller to a deep DCM threshold value. In various embodiments, the switching frequency of the synchronous rectifier is measured to infer the switching frequency of the primary side controller, to which it correlates. In some embodiments, the deep DCM threshold value is 100 Hz. Using the previously described embodiments, where only one encoded bit is transferred in one power transfer (or switching) cycle, 8 switching cycles would be required to transfer an 8-bit encoded message protocol. Requiring 8 switching cycles is very long for the power converter system to respond to the protocol command sent by the sink device (e.g., the slow response may affect system stability), thus a new message communication mode procedure is needed for a power system operating in deep DCM condition.

During the start of transfer step 150, the system waits for a short period of time after the voltage on the voltage-sensing terminal 52 no longer includes valley points, (190, 192 and 194 for example). The synchronous rectifier detects the absence of valley points by measuring a voltage change in the bus voltage 14, and then initiates a pulse, before the next activation of the switching signal 42, to signify a start flag for the deep DCM condition. The primary-side controller detects the start flag as a waveform distortion at the voltage-sensing terminal 52. After initiating the pulse, the synchronous rectifier controller connects a bleeder circuit to increase a load on the power converter, thereby forcing the power converter from the deep DCM condition into a DCM condition with a higher switching frequency. In various embodiments, the bleeding circuit includes a bleeding resistor ($R_{BLD}$) 88 and a switch coupled between the bleeding resistor 88 and the ground. The switch is implemented in the secondary side control circuit according to an embodiment of the present invention. The data transfer and the end of transfer are the same as the communication sequence shown in FIG. 6. Referring to FIG. 2, the message encoder 114 is coupled to the SR controller 112 to receive the control signal for detecting the switching frequency of the control signal. Therefore, the message encoder can determine that the power converter system is in the deep DCM condition when the switching frequency is lower than the deep DCM threshold value.

Figure 8:
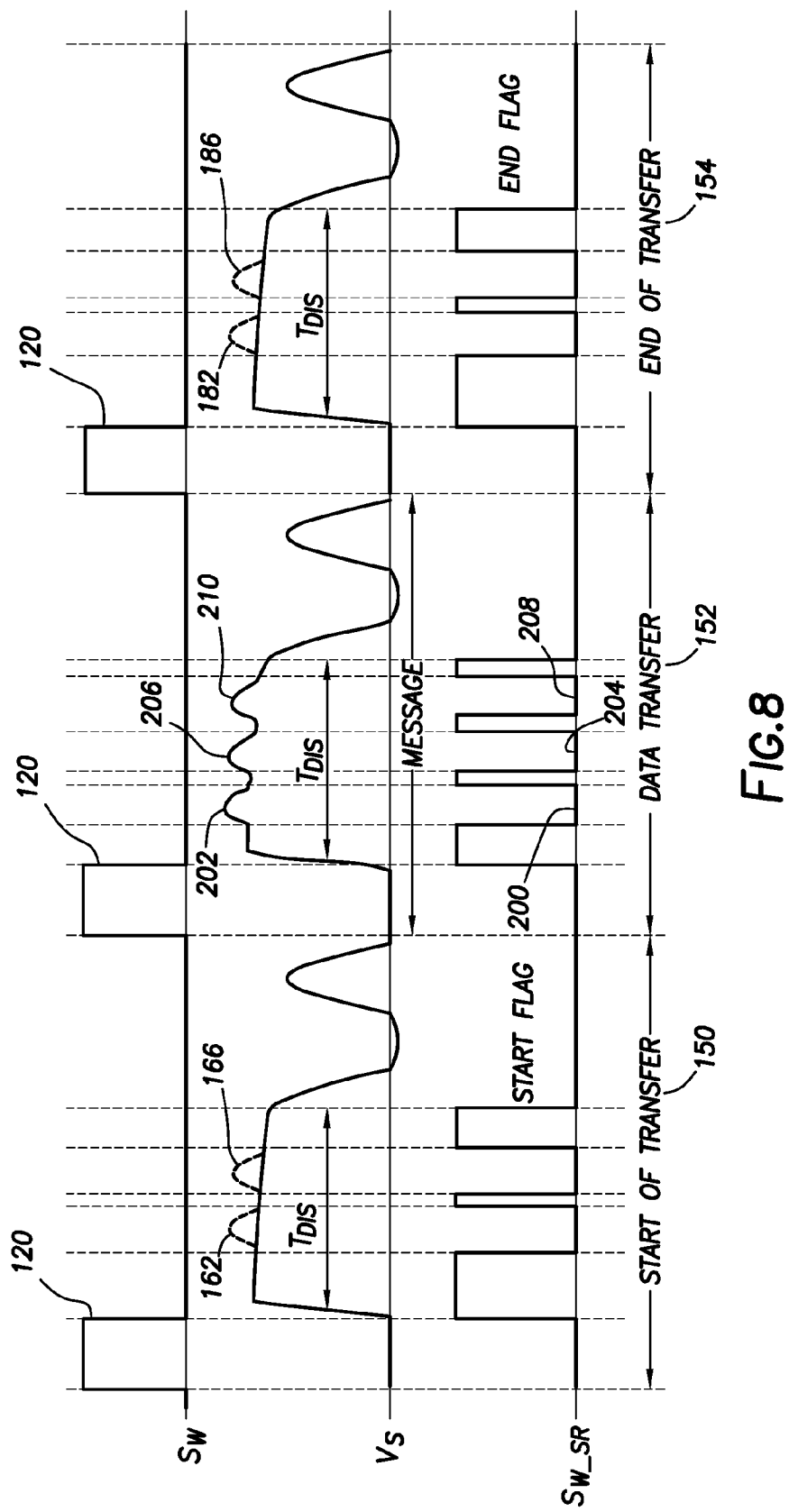
FIG. 8 is a graphical view of the switching signals $S_W$, $S_{W\_SR}$, and the sensing signal $V_S$ of a communication sequence during a DCM condition in accordance with another embodiment of the present disclosure.

FIG. 8 shows another embodiment of a communication sequence of a flyback power converter operating in a DCM condition, including the voltage ($V_S$) 52 on the voltage-sensing terminal, the switching signal ($S_W$) 42 from the primary side controller 30 and the switching signal ($S_{W\_SR}$) 68 from the synchronous rectifier 60. In this embodiment, all the commands issued by the sink device require pre-defined waveforms of the voltage sensing signal ($V_S$) 52 during the discharge period 132, corresponding to the pre-defined switching sequence of the SR switch 64. In one example, the Constant Current (CC) mode implemented by the current control circuit 102, is encoded as three pulses, the Constant Voltage (CV) mode implemented by the voltage control circuit 100 is encoded as four pulses, and the protection mode implemented by the protection circuit 104 is encoded as five pulses. As shown in FIG. 8, the switching signal 68 is deactivated (e.g., pulsed) at 200 to cause the waveform distortion 202, at 204 to cause the waveform distortion 206 and at 208 to cause the waveform distortion 210, thus encoding the CC mode.

In one variation to the embodiment in FIG. 8, the number of distortions during either the start of transfer 150 or the end of transfer 154, or both, is one or more distortions. In another variation to the embodiment in FIG. 8, the communication sequence does not have a start of transfer step 150 and end of transfer step 154, but rather only requires the data transfer step 152. During the data transfer step 152, the synchronous rectifier controller transfers a message based on pre-defined waveforms of the voltage-sensing signal 52, and the primary side controller 30 responses to the message based on pre-defined waveforms at the voltage-sensing signal 52.

Figure 9:
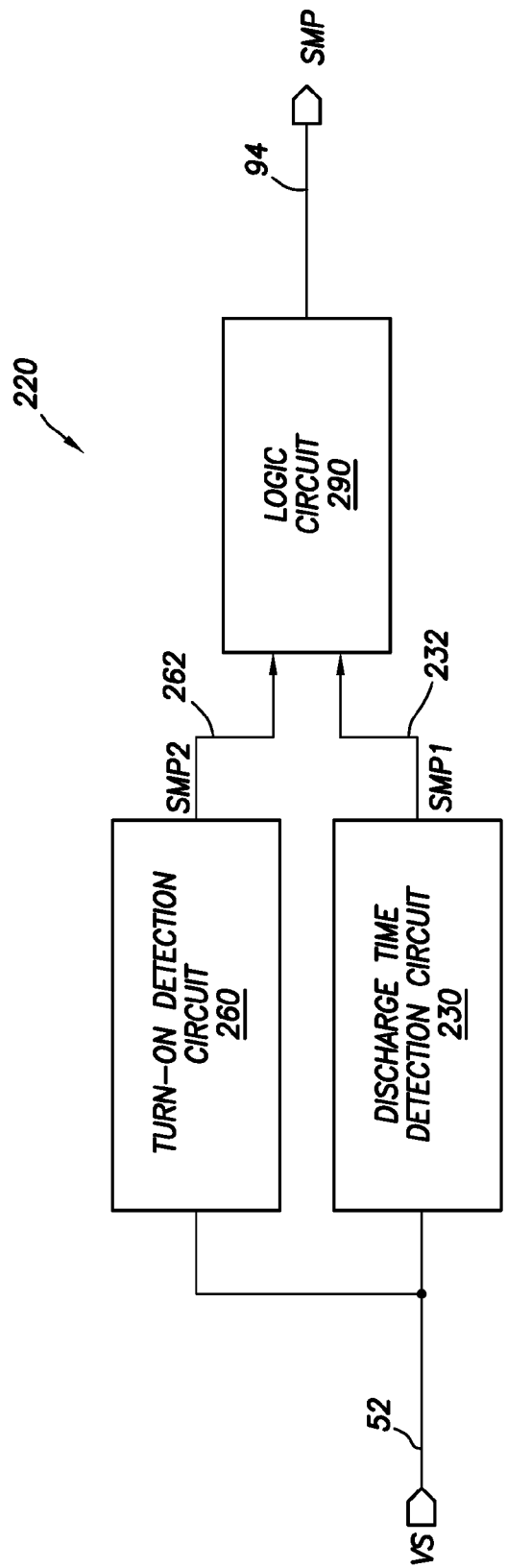
FIG. 9 is a functional block diagram of a detection circuit according to an embodiment of the present disclosure.

FIG. 9 shows a functional block diagram of a detection circuit 220 according to an embodiment of the present invention. The detection circuit 220 of the primary side controller 30 comprises a discharge time detection circuit 230, a turn-on detection circuit 260 and a logic circuit 290, receiving an SMP1 output 232 from the discharge time detection circuit 230, and an SMP2 output 262 from the turn-on detection circuit 260. The discharge time detection circuit 230 and the turn-on detection circuit 260 are coupled to the voltage-sensing terminal to receive the voltage-sensing signal ($V_S$) 52. The discharge time detection circuit 230 detects the voltage-sensing signal 52 for detecting the first zero-crossing point (e.g., valley point) as shown as 190 in FIG. 7 and generating a signal SMP1 232 to define the end of the discharge time 132. The start of the discharge time 132 is defined by the falling edge 120 of the switching signal 42.

The turn-on detection circuit 260 measures the voltage-sensing signal for detecting the start of the waveform distortion, and generates the signal SMP2 262. The logic circuit receives the signals SMP1 232 and SMP2 262 to determine the presence of, and the number of, distortions during the discharge period 132, and further comprises a counter to counter a number of distortions. In one embodiment, the logic circuit 290 outputs the signal SMP 94 as a digitally encoded signal including the number of detected distortions. In another embodiment, the logic circuit 290 outputs the signal SMP 94 for each distortion and the message decoder of FIG. 2 includes a counter, to count the number of distortions.

FIG. 10 shows a circuit diagram of an embodiment of the discharge time detection circuit 230. The discharge time detection circuit 230 comprises a delay cell 236, a comparator 234, an offset voltage ($V_{OS1}$) 240, and a flip-flop 244 (e.g., a bistable device). The delay cell 236 delays the voltage-sensing signal ($V_S$) 52 to generate a delay signal ($V_{SD}$) 238. The voltage-sensing signal 52 is offset by the offset voltage 240 to generate an offset signal ($V_{S1}$) 242. The negative input terminal and the positive input terminal of the comparator 234 receive the offset signal 242 and the delay signal 238, respectively. The output terminal of the comparator 234 is coupled to the reset terminal of the flip-flop 244 to reset the flip-flop 244 for disabling the signal SMP1 232 when the delay signal 238 is higher than the offset signal 242. The time during which the SMP1 signal is high indicates the discharge time 132.

FIG. 11 shows a circuit diagram of an embodiment of the delay cell 236. In one embodiment, the delay cell comprises a resistor 248 and a capacitor 250. In another embodiment, the delay cell 236 includes a digital delay. FIG. 12 is a graphical view of the operation of the discharge time detection circuit of FIG. 10, showing the detection of the end of the discharge period 132 by comparing the offset signal 242 with a delay signal 238, both derived from the voltage-sensing signal 52. The output SMP1 232 transitions when the offset signal 242 falls below a value of the delay signal 238. The signal SMP2 is discussed below in the context of FIG. 14.

Figure 13:
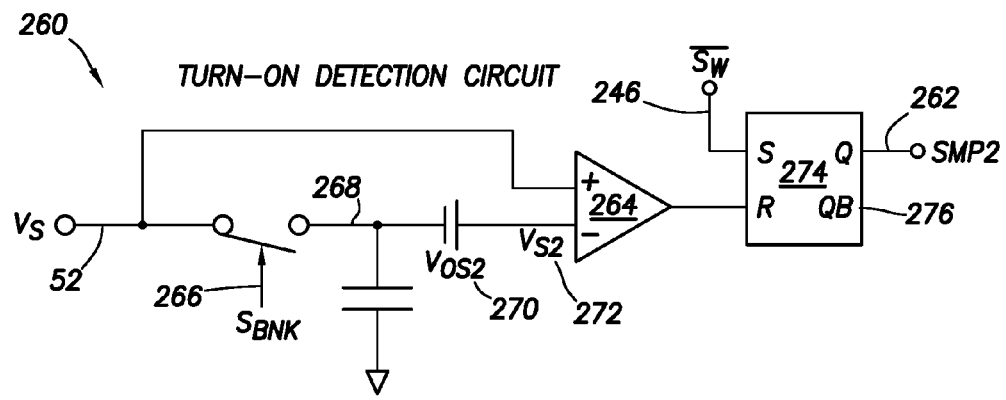
FIG. 13 is a schematic view of the turn-on detection circuit shown in FIG. 9 according to an embodiment of the present disclosure.

FIG. 13 shows an embodiment of the turn-on detection circuit 260. The turn-on detection circuit 260 receives the voltage-sensing signal 52 at a positive terminal of a comparator 264. The voltage-sensing signal 52 is further sampled by a blanking signal ($S_{BNK}$) 266 controlling a switch to provide a sampled voltage 268, which is stored on a capacitor. The sampled voltage 268 is offset with an offset voltage ($V_{OS2}$) 270 to create the offset sample ($V_{S2}$) 272, which is received at a negative terminal of the comparator 264. The output of the comparator 264 is connected to the reset terminal of a flip-flop 274, (or similar bistable device).

Figure 14:
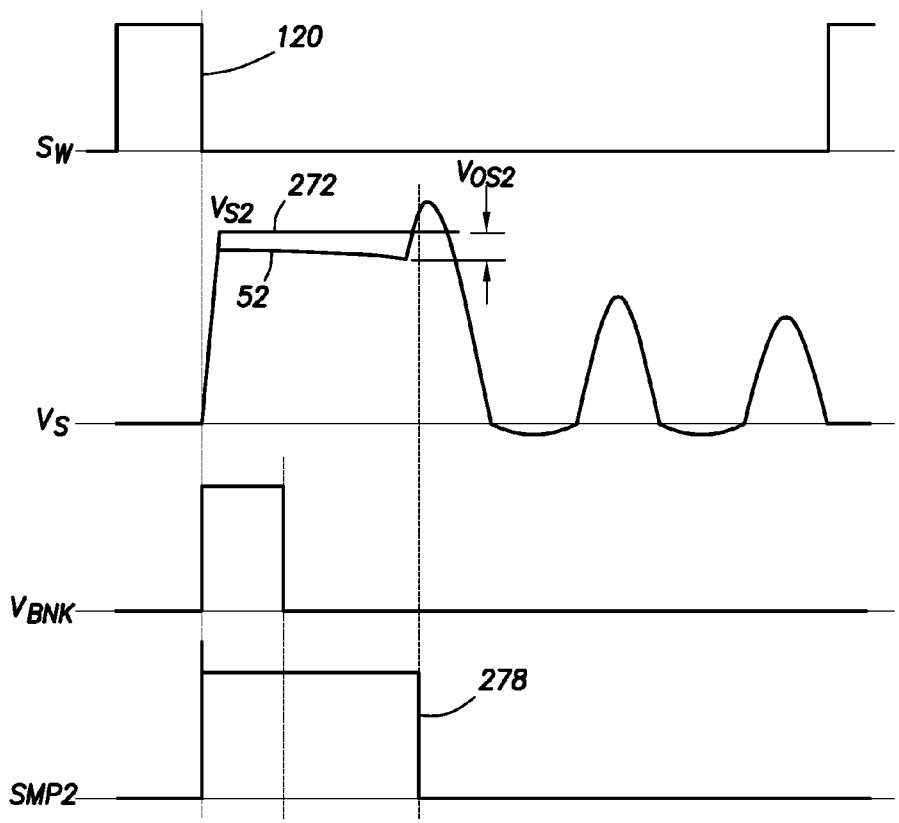
FIG. 14 is a graphical view of the switching signal $S_W$, the sensing signal $V_S$, signals $S_{BNK}$ and SMP2 according to an embodiment of the present disclosure.

Referring to FIG. 13 and FIG. 14, the flip-flop 274 is "SET" with an inverted signal of the falling edge 120 of the switching signal 42, causing a high state at the SET (S) input 246 to the flip-flop 274 and thereby causing SMP2 262 to switch to a high state. The output of the comparator 264 switches to a high state when the voltage-sensing signal 52 transitions higher than the offset sample 272 due to a waveform distortion, thereby resetting the flip-flop 274 with a high state at the RESET input and causing the SMP2 signal to transition back to a low state at 278.

In another embodiment of the turn-on detection circuit 260, the SET input of the flip-flop 274 is driven by an AND gate, with inputs from the inverted signal of the switching signal 42 and an inverted output (QB) 276 of the flip-flop 274, to allow detection of multiple waveform distortions during the discharge period 132. For example, when the inverted signal of signal 42 transitions high (e.g., switching signal 42 transitions low at 120) and QB is high, flip-flop 274 is SET, SMP2 transitions high and QB transitions low, thus disabling the AND gate. When the flip-flop 274 is reset, QB momentarily transitions high, to SET the flip-flop, causing QB to transition low and subsequently disable the AND gate.

Referring to FIG. 3, FIG. 7, FIG. 13 and FIG. 14, in another embodiment, where the power system operates in a deep DCM condition, the resonance 126 (see also FIG. 3) during the start of transfer 150, does not cause a reset of the flip-flop 274 because the offset sample 272 is sufficiently higher than the attenuated resonant waveforms 126. Detection of the start flag 196 occurs after the discharge period 132 but is enabled to be detected after the discharge period 132 by a gating signal provided to the logic circuit 290 that indicates that the deep DCM condition has been detected. The gating signal is activated by comparing a frequency of the switching signal 42 to a threshold frequency, (e.g., 100 Hz).

Referring to FIG. 12 and FIG. 14, the detection of the waveform distortion of FIG. 14, as indicated by the falling edge 278 of SMP2 262, occurs prior to the end of the discharge period 132 defined by SMP1. When no waveform distortion is present, SMP2 262 remains high for the entire discharge period 132. Referring to FIG. 12, when SMP2 262 transitions low at 252 after the end of the discharge period 132 (for example due to the resonance 126 of FIG. 3), SMP 94 will not consider a bit to have been received. In contrast, the falling edge 254 of SMP2 262 in FIG. 12 occurs prior to the end of the discharge period 132, thus will cause a waveform distortion (not shown) and be detected as a valid bit for the message decoder 96.

As will be appreciated, embodiments as disclosed include at least the following. In one embodiment, a method for communicating with a power converter comprises initiating a communication sequence by sensing a first distortion of a sensed waveform during a discharge period of a first power transfer cycle of the power converter. The sensed waveform is proportional to a secondary current of the power converter. At a primary side of the power converter a data bit is received from a secondary side of the power converter, by sensing a second distortion to represent one state of the data bit and sensing an absence of the second distortion to represent another state of the data bit. The second distortion is applied to the secondary current during the discharge period of a subsequent power transfer cycle.

Alternative embodiments of the method for communicating with a power converter include one or the following features, or any combination thereof. The communication sequence is terminated by sensing the first distortion of the sensed waveform during the discharge period of a last power transfer cycle of the power converter. The first distortion includes one or more pulses applied to the secondary current by interrupting a path conducting the secondary current. The second distortion includes one or more pulses applied to the secondary current by interrupting a path conducting the secondary current. Pluralities of data bits are received at the primary side, each data bit communicated in a respective subsequent power transfer cycle. A deep Discontinuous Conduction Mode (DCM) state of the power converter is detected by comparing a primary side switching frequency to a deep DCM threshold value. A load of the power converter is increased in response to detecting the deep DCM state, and initiating the communication sequence by sensing the first distortion of the sensed waveform after the discharge period of the first power transfer cycle. A value of the protection circuit is changed in response to receiving the data bit. A value of a regulation circuit is changed in response to receiving the data bit.

In another embodiment, a method for communicating with a power converter comprises receiving at a primary side of the power converter, a one or more data bits from a secondary side of the power converter, by sensing a respective data distortion of a sensed waveform for each data bit during a discharge period of power transfer cycle of the power converter. The sensed waveform is proportional to a secondary current of the power converter. The one or more data bits are decoded to determine a response of the power converter.

Alternative embodiments of the method for communicating with a power converter include one or the following features, or any combination thereof. A communication sequence is initiated before receiving the one or more data bits, by sensing a flag distortion of the sensed waveform during the discharge period of a first power transfer cycle of the power converter, and the communication sequence is terminated after receiving the one or more data bits by sensing the flag distortion of the sensed waveform during the discharge period of a last power transfer cycle of the power converter. The response of the power converter includes regulating a constant current when three data bits are received, the response of the power converter includes regulating a constant voltage when four data bits are received, and the response of the power converter includes activating a protection mode when five data bits are received.

In another embodiment, a communication circuit for a power converter comprises a primary circuit connected to a primary side of the power converter, and configured to sense a distortion of a waveform with a detection circuit to detect a data bit. The waveform is proportional to a secondary current of the power converter. A secondary circuit is connected to a secondary side of the power converter, and configured to encode a protocol message as a data bit, wherein the protocol message is received from a sink device connected thereto, and to communicate the data bit to the primary circuit by distorting the secondary current to represent one state of the data bit and by not distorting the secondary current to represent another state of the data bit.

Alternative embodiments of the communication circuit for a power converter include one of the following features, or any combination thereof. The detection circuit includes a discharge time detection circuit configured to determine a discharge period of the secondary current, a turn-on detection circuit configured to detect the distortion of the waveform, and a logic circuit configured to determine if the distortion is detected during the discharge period. The discharge time detection circuit includes a comparator configured to compare the waveform delayed with a delay circuit to the waveform offset with an offset circuit, an output of the comparator resetting a state of a bistable device to determine an end of the discharge period. The turn-on detection circuit includes a comparator configured to compare a sampled waveform offset with an offset circuit to the waveform, an output of the comparator resetting a state of a bistable device to determine the start of the distortion of the waveform. The primary circuit further comprises a message decoder configured to decode at least one data bit to determine a response, the response being at least one of changing a value of a protection circuit and changing a value of a regulation circuit. The secondary circuit includes a protocol decoder configured to decode a protocol message from the sink device, and a message encoder configured to encode the protocol message as one or more data bits, each data defined by a switching sequence of a synchronous rectifier switch. The synchronous rectifier switch is a same switch used by a synchronous rectifier controller configured to rectify the secondary current. The secondary circuit comprises a bleeder circuit configured to increase a current sink of the secondary current in response to the primary circuit detecting a deep Discontinuous Conduction Mode.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for communicating with a power converter comprising:
    initiating a communication sequence by sensing a first distortion of a sensed waveform during a discharge period of a first power transfer cycle of the power converter, the sensed waveform being proportional to a secondary current of the power converter; and
    receiving at a primary side of the power converter, a data bit from a secondary side of the power converter by sensing a second distortion to represent one state of the data bit and sensing an absence of the second distortion to represent another state of the data bit, the second distortion applied to the secondary current during the discharge period of a subsequent power transfer cycle.

2. The method of claim 1 further comprising terminating the communication sequence by sensing the first distortion of the sensed waveform during the discharge period of a last power transfer cycle of the power converter.

3. The method of claim 1 wherein the first distortion includes one or more pulses applied to the secondary current by interrupting a path conducting the secondary current.

4. The method of claim 1 wherein the second distortion includes one or more pulses applied to the secondary current by interrupting a path conducting the secondary current.

5. The method of claim 1 further comprising receiving at the primary side, a plurality of data bits, each data bit communicated in a respective subsequent power transfer cycle.

6. The method of claim 1 further comprising detecting a deep Discontinuous Conduction Mode (DCM) state of the power converter by comparing a primary side switching frequency to a deep DCM threshold value.

7. The method of claim 6 further comprising increasing a load of the power converter in response to detecting the deep DCM state, and initiating the communication sequence by sensing the first distortion of the sensed waveform after the discharge period of the first power transfer cycle.

8. The method of claim 1 wherein a value of a protection circuit is changed in response to receiving the data bit.

9. The method of claim 1 wherein a value of a regulation circuit is changed in response to receiving the data bit.

10. A method for communicating with a power converter comprising:
    receiving at a primary side of the power converter, a one or more data bits from a secondary side of the power converter, by sensing a respective data distortion of a sensed waveform for each data bit during a discharge period of power transfer cycle of the power converter, the sensed waveform being proportional to a secondary current of the power converter;
    decoding the one or more data bits to determine a response of the power converter;
    initiating a communication sequence before receiving the one or more data bits, by sensing a flag distortion of the sensed waveform during the discharge period of a first power transfer cycle of the power converter; and
    terminating the communication sequence after receiving the one or more data bits by sensing the flag distortion of the sensed waveform during the discharge period of a last power transfer cycle of the power converter.

11. The method of claim 10 wherein:
    the response of the power converter includes regulating a constant current when three data bits are received,
    the response of the power converter includes regulating a constant voltage when four data bits are received, and
    the response of the power converter includes activating a protection mode when five data bits are received.

12. A communication circuit for a power converter comprising:
    a primary circuit connected to a primary side of the power converter, and configured to sense a distortion of a waveform with a detection circuit to detect a data bit, the waveform proportional to a secondary current of the power converter; and
    a secondary circuit connected to a secondary side of the power converter, and configured to encode a protocol message as the data bit, wherein the protocol message is received from a sink device connected thereto, and to communicate the data bit to the primary circuit by distorting the secondary current to represent one state of the data bit and by not distorting the secondary current to represent another state of the data bit, wherein the secondary circuit includes a protocol decoder configured to decode a protocol message from the sink device, and a message encoder configured to encode the protocol message as one or more data bits, each data defined by a switching sequence of a synchronous rectifier switch.

13. The communication circuit of claim 12 wherein the detection circuit includes a discharge time detection circuit configured to determine a discharge period of the secondary current, a turn-on detection circuit configured to detect the distortion of the waveform, and a logic circuit configured to determine if the distortion is detected during the discharge period.

14. The communication circuit of claim 13 wherein the discharge time detection circuit includes a comparator configured to compare the waveform delayed with a delay circuit to the waveform offset with an offset circuit, an output of the comparator resetting a state of a bistable device to determine an end of the discharge period.

15. The communication circuit of claim 13 wherein the turn-on detection circuit includes a comparator configured to compare a sampled waveform offset with an offset circuit to the waveform, an output of the comparator resetting a state of a bistable device to determine the start of the distortion of the waveform.

16. The communication circuit of claim 12 wherein the primary circuit further comprises a message decoder configured to decode at least one data bit to determine a response, the response being at least one of changing a value of a protection circuit and changing a value of a regulation circuit.

17. The communication circuit of claim 12 wherein the synchronous rectifier switch is a same switch used by a synchronous rectifier controller configured to rectify the secondary current.

18. The communication circuit of claim 12 wherein the secondary circuit comprises a bleeder circuit configured to increase a current sink of the secondary current in response to the primary circuit detecting a deep Discontinuous Conduction Mode.

* * * * *